United States Patent
Dias et al.

[11] Patent Number: 6,122,011
[45] Date of Patent: Sep. 19, 2000

[54] APPARATUS AND METHOD FOR CREATING OR EDITING A CHANNEL MAP

[75] Inventors: Steve Dias, Sharon, Mass.; Ken Hancock, Nashua, N.H.; Roy J. Mankovitz, Encino, Calif.; Jamey Rallis, Burlington, Mass.; P. Christopher Schoaff, Westford, Mass.; Thomas E. Ward, Weston, Mass.

[73] Assignee: Index Systems, Inc., Virgin Islands (Br.)

[21] Appl. No.: 09/040,001

[22] Filed: Mar. 17, 1998

Related U.S. Application Data

[63] Continuation-in-part of application No. 08/579,643, Dec. 27, 1995, abandoned.
[60] Provisional application No. 60/053,330, Jul. 21, 1997, and provisional application No. 60/061,119, Oct. 6, 1997.

[51] Int. Cl.[7] .............................. H04N 5/50; H04N 5/445
[52] U.S. Cl. ...................... 348/569; 348/906; 348/565; 348/564
[58] Field of Search ...................... 348/906, 569, 348/563, 564, 565, 567; H04N 5/50, 5/445, 5/45

[56] References Cited

U.S. PATENT DOCUMENTS

| | | |
|---|---|---|
| 5,303,063 | 4/1994 | Kim et al. ........................... 358/335 |
| 5,307,173 | 4/1994 | Yuen et al. .......................... 358/335 |
| 5,416,508 | 5/1995 | Sakuma et al. .......................... 348/3 |
| 5,532,754 | 7/1996 | Young et al. ........................ 348/569 |
| 5,559,548 | 9/1996 | Davis et al. ............................ 348/6 |
| 5,583,560 | 12/1996 | Florin et al. ........................... 348/7 |
| 5,585,866 | 12/1996 | Miller et al. ........................ 348/731 |
| 5,629,733 | 5/1997 | Youman et al. ......................... 348/7 |
| 5,850,218 | 12/1998 | LaJoie ................................ 348/906 |

FOREIGN PATENT DOCUMENTS

| | | | |
|---|---|---|---|
| 21283 | 1/1992 | Japan | .......................... H04N 5/44 |
| 757334 | 3/1995 | Japan | .......................................... 15/2 |
| 19391 | of 0000 | WIPO | ......................... H04N 1/782 |
| WO 96/27982 | 9/1996 | WIPO . | |

*Primary Examiner*—Sherrie Hsia
*Attorney, Agent, or Firm*—Christie, Parker & Hale, LLP

[57] ABSTRACT

A channel map is created and/or edited with the aid of a PIP window in which a real time television program is displayed. The PIP window is displayed on a monitor screen at the same time as a channel map of pairs of network names and local channel numbers. The local channel numbers can be individually changed to create the channel map or edit the pairings of network name and local channel number. When the local channel numbers are changed, the tuner for the PIP window also automatically changes so the television program displayed in the PIP window corresponds to the television program telecast on the local channel number displayed on the screen. This provides verification of the accuracy of the pairing of network names and local channel numbers in the channel map.

27 Claims, 7 Drawing Sheets

FIG. 6

2/24, 1800, .5, 2, CBS, 541126
CBS EVENING NEWS, BRIEF DESCRIPTION

2/24, 1800, .5, 4, NBC 7334512
NEWS AT 6, BRIEF DESCRIPTION

2/24, 1800, .5, 7, ABC, 899775
EYEWITNESS NEWS AT 6, BRIEF DESCRIPTION

2/24, 1800, .5, 11, FOX, 25133
MARRIED WITH CHILDREN, MARRIED WITH
CHILDREN—AL SCOFFS AT SUGGESTION TO
HIRE PROFESSIONAL FOR LEAK 6:00 30 MIN.

2/24, 1800, 1.0, 13, KCOP, 794366
COSBY SHOW, BRIEF DESCRIPTION

⋮

2/24, 1800, 1.0, 28, PBS, 635112
NIGHTLY BUSINESS NEWS, BRIEF DESCRIPTION

⋮

2/24, 1900, .5, 2, CBS, 1122455
LATE NIGHT MOVIE, BRIEF DESCRIPTION

⋮

APPARATUS AND METHOD FOR CREATING OR EDITING A CHANNEL MAP

CROSS-REFERENCE TO RELATED APPLICATIONS

This application is a continuation-in-part of Application No. 08/579,643, filed on Dec. 27, 1995, abandoned. The provisional patent Application Nos. 60/053,330, filed on Jul. 21, 1997 and 60/061,119, filed on Oct. 6, 1997, are incorporated fully herein by reference.

BACKGROUND OF THE INVENTION

This invention relates to the reception of television signals and more particularly to channel mapping local television channel numbers to regional or network names.

A table mapping network names to local channel numbers, called "a channel map", is used to set a television receiver or a VCR for future unattended operation or the display an on-screen television guide for tuning by title. A television or VCR user can create a channel map by manually keying in the relationship between network names and local channel numbers from a print guide responsive to on-screen prompts. Alternatively, a user can select the proper channel map for his or her geographic area from channel maps transmitted in the VBI of a television signal by keying in the user's zip code as disclosed in the above-referenced PCT application. In the latter case, it sometimes becomes necessary to edit one or more entries in the channel map to account for local anomalies.

SUMMARY OF THE INVENTION

According to the invention, a channel map is created and/or edited with the aid of a PIP window in which a real time television program is displayed. The PIP window is displayed on a monitor screen at the same time as a channel map of pairs of network names and local channel numbers. The local channel numbers can be individually changed to create the channel map or edit the pairings of network name and local channel number. When the local channel numbers are changed, the tuner for the PIP window also changes so the television program displayed in the PIP window corresponds to the television program telecast on the local channel number displayed on the screen. This provides verification of the accuracy of the pairing of network names and local channel numbers in the channel map.

BRIEF DESCRIPTION OF THE DRAWINGS

The features of specific embodiments of the best mode contemplated of carrying out the invention are illustrated in the drawings, in which:

FIG. 6 is a diagram illustrating a portion of a program schedule according to the present invention.

DETAILED DESCRIPTION OF THE SPECIFIC EMBODIMENTS

Figure 1:
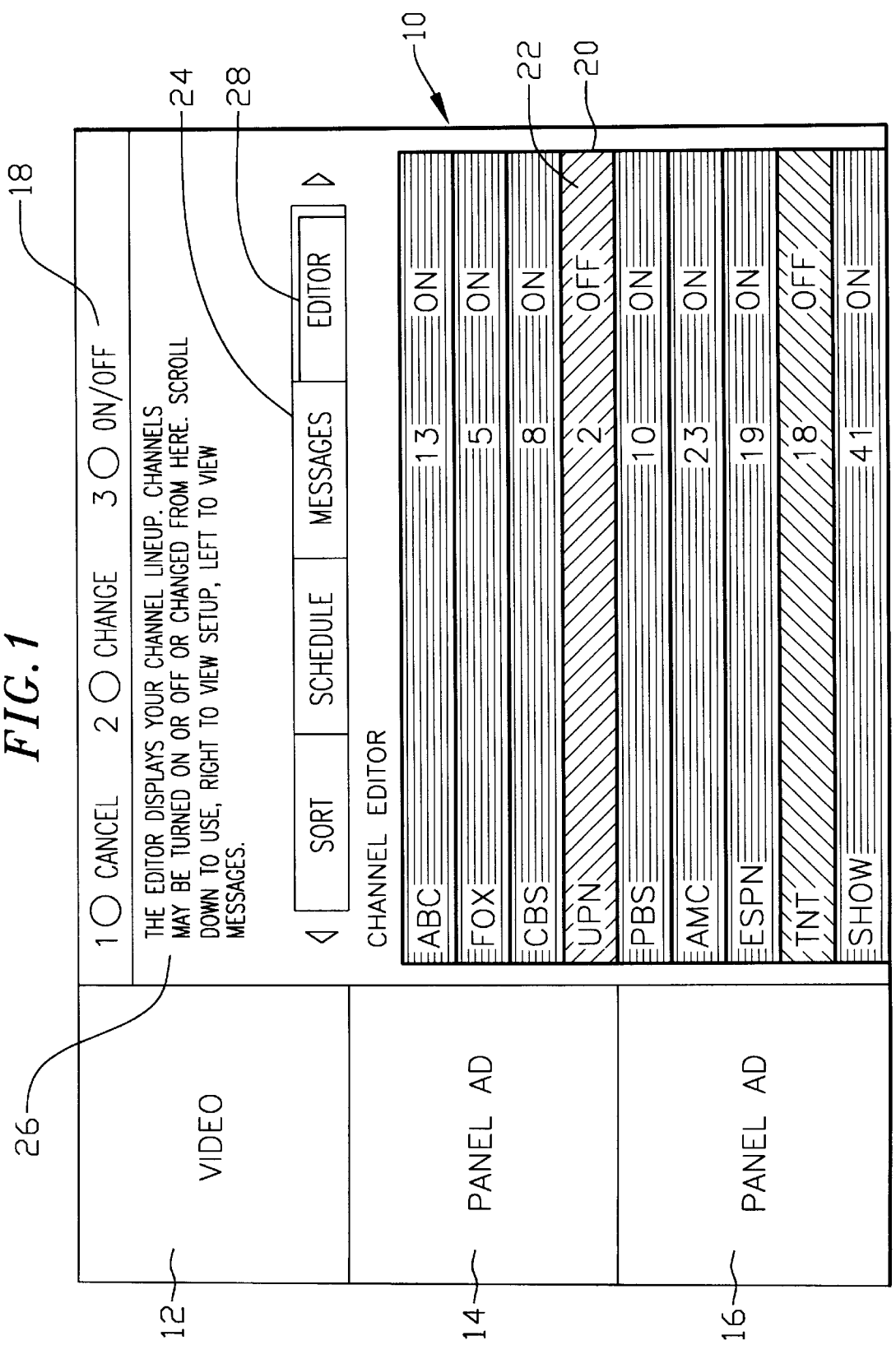
FIG. 1 is a television screen illustrating one embodiment of the invention.

In FIG. 1 a monitor screen 10 is shown in the format of provisional Application No. 60/053,330 with several minor modifications. Screen 10 is divided into a number of different display areas. A real time telecast television program is displayed in a video area 12. This display preferably appears as a PIP window generated by a conventional PIP chip. As the microprocessor (not shown) changes the television tuner (not shown), it also changes the program displayed in video area 12 to reflect the local channel number to which the tuner is set. Panel ad areas 14 and 16, which do not play a direct roll in the practice of the invention, lie below video area 12. A banner area 18 lies at the top of screen 10 adjacent to area 12. A channel map area 20 occupies the bottom two-thirds of screen 10 to the right of areas 12, 14, and 16. Area 20 comprises a plurality of horizontally extending channel panels or lines that display respectively in separate columns: a network name, e.g. ABC; a local channel number, e.g. "13"; and the status of the channel availability, e.g. ON or OFF. The ON channels have a different background color from the OFF channels. Responsive to up/down arrow keys on the remote controller, one of the channels is highlighted by a cursor 22. Above area 20 lies a horizontally extending menu bar area 24 by which the user can select among a number of different functions. Between menu bar area 24 and banner area 18 lies a detail area 26.

One of the functions of menu bar area 24 is highlighted by a cursor 28. The up/down and right/left arrow keys of a remote controller (not shown) are operated to move cursor 28 to select one of the functions of menu bar area 24. The outwardly pointing arrows indicate that more functions can be selected and displayed by moving the arrow keys to the right or left. If, as illustrated in FIG. 1, the EDITOR function is selected by cursor 28 and then an OK key on the remote controller is pressed, a channel map is displayed in area 20 and cursor 22 highlights one of the channel lines in area 20. The channel map could be downloaded from the VBI of a television signal responsive to the user inputting his or her zip code, as described in the above-referenced PCT application. Alternatively, the network name-local channel number pairs could be keyed in manually from a print guide by the user through the number key pad of the remote controller aided by on-screen prompts if desired. Alternatively, the channel map could be constructed channel by channel by comparing a program displayed in video area 12 with the title displayed in the highlighted channel line in the manner described in Application No. 08/579,643.

By scrolling through area 20 with cursor 22 other channel lines containing network name-local channel number pairs can be displayed. Prompts for operating the EDITOR function are displayed in detail area 26. The prompts in banner area 18 and detail area 26 appear only after a channel line in area 20 is highlighted. The user can turn the channel highlighted by cursor 22 ON or OFF by pressing the number "3" on the keypad of the remote controller as indicated in banner 18. To change the local channel number displayed in the channel line highlighted by cursor 22, the number "2" on the keypad is pressed as indicated in banner area 18 and then the new local channel number is keyed in with the keypad. According to the invention, the tuner is also automatically set to the new local channel number and the program telecast on the new local channel number is displayed in video area 12. Thus, the user can confirm the correspondence between the new local channel number and the network channel name. The user can cancel all the changes made during the current session in the channel editor mode by pressing the number "1" on the keypad, as indicated by banner area 18. Alteratively, instead of number keys, the cancel, change, and on/off commands could be issued by colored keys on the remote controller that correspond to color coded circles in banner area 18.

The described channel mapping technique could be used in conjunction with any television receiver, VCR, or cable box that employs channel mapping. However, the invention is particularly useful with an electronic program guide, such as that disclosed in Application No. 08/579,643 or Application No. 60/053,330. In such case, the titles could also be displayed in the channel lines.

Figure 2:
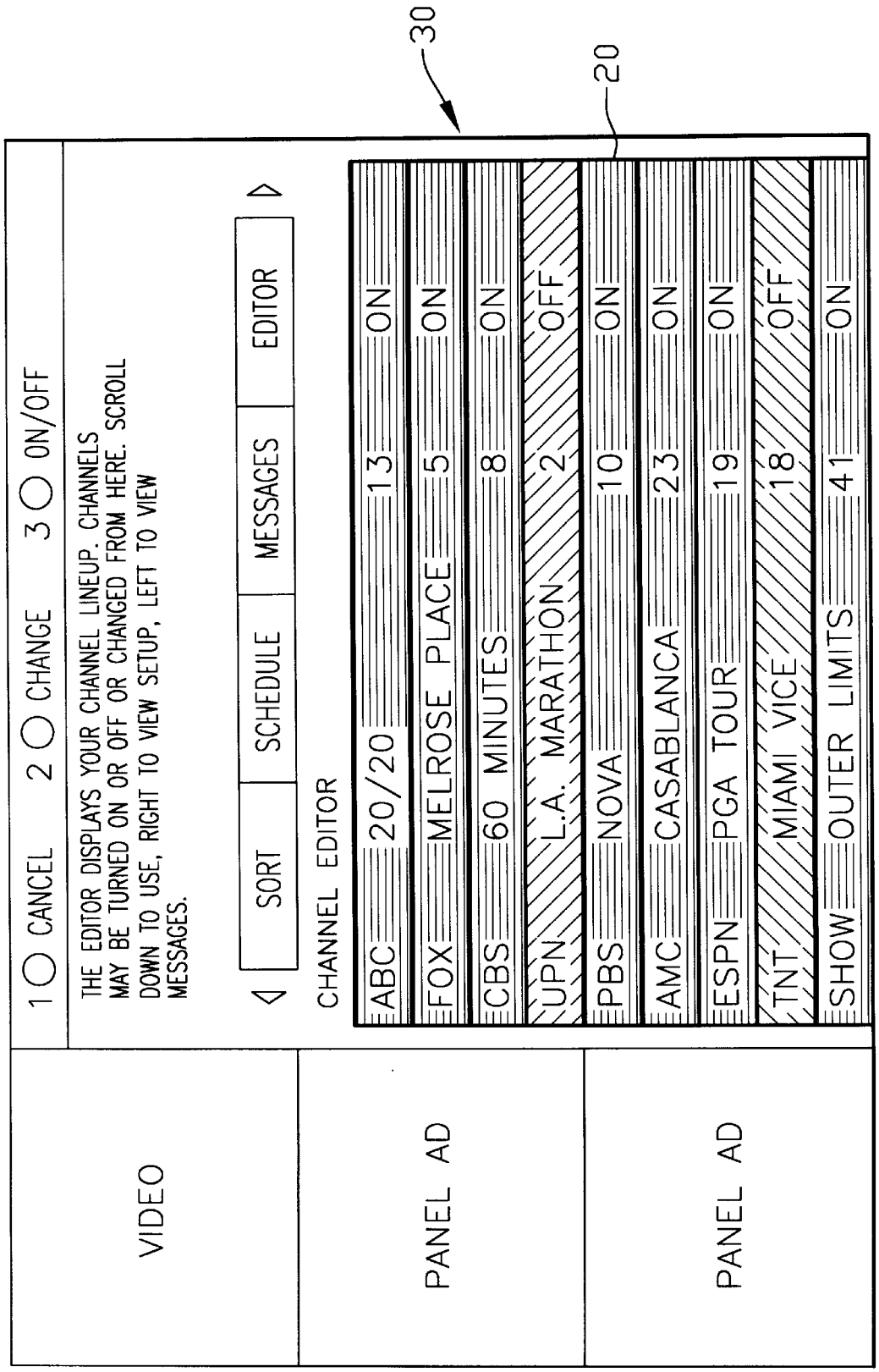
FIG. 2 is a television screen illustrating another embodiment of the invention.

FIG. 2 illustrates a television screen 30 which is the same as screen 10 in FIG. 1, except for the addition of program titles in channel map area 20. The program titles make it easier for the user to confirm the accuracy of the network name-local channel number pairs in the channel map or to create a channel map from scratch. Specifically, if the program displayed in video area 12 corresponds to the title in the highlighted channel line, the local channel number therein is properly paired with the network name.

Although it is preferable to display the television program in a PIP window simultaneously with the channel map, the channel map could be overlaid on the television program or presented in another format that presents both aspects for the user.

Another embodiment of the invention is illustrated in FIGS. 3–7.

Figure 3:
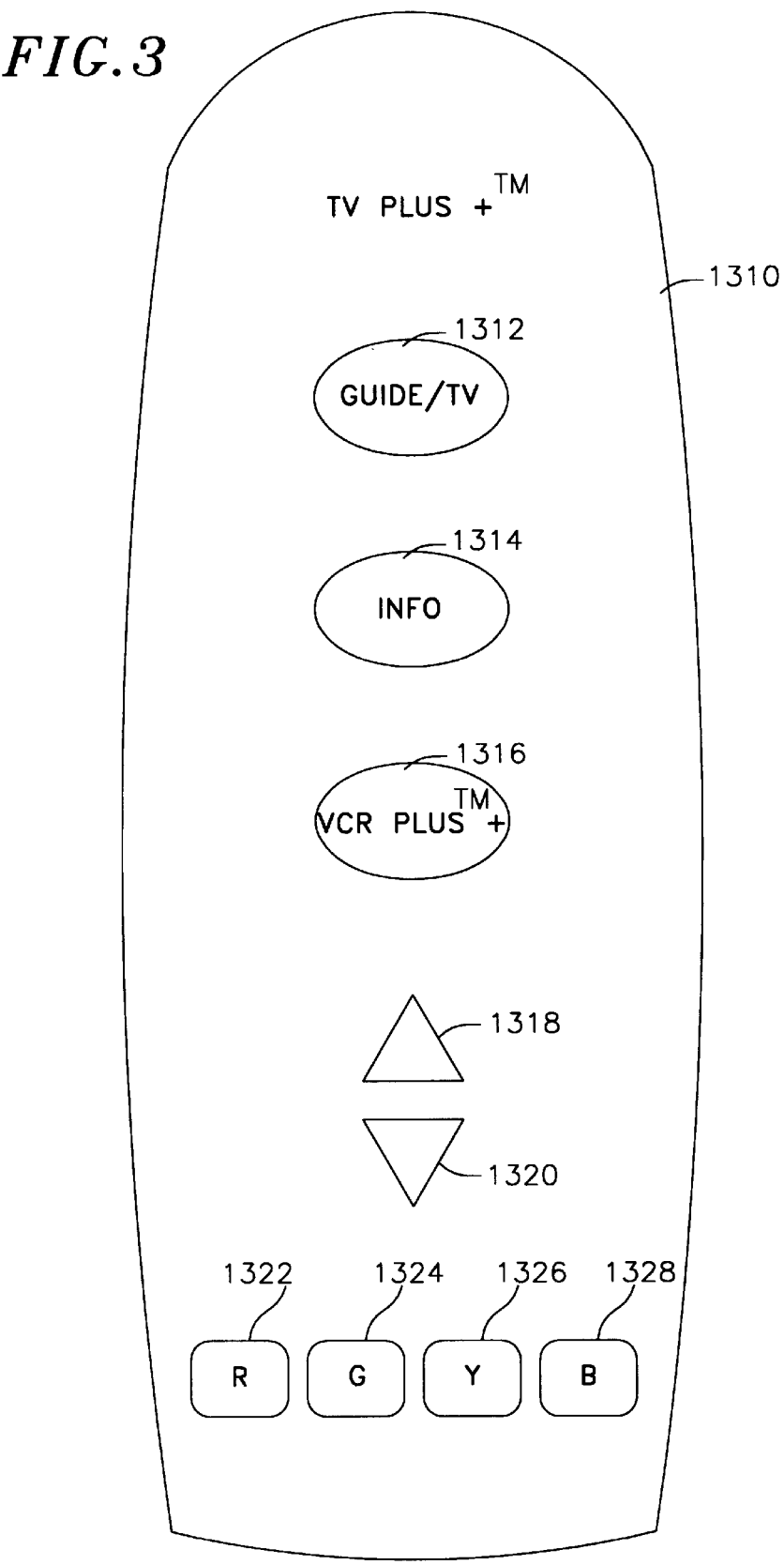
FIG. 3 is a view of a remote controller providing a viewer input device.
Figure 4:
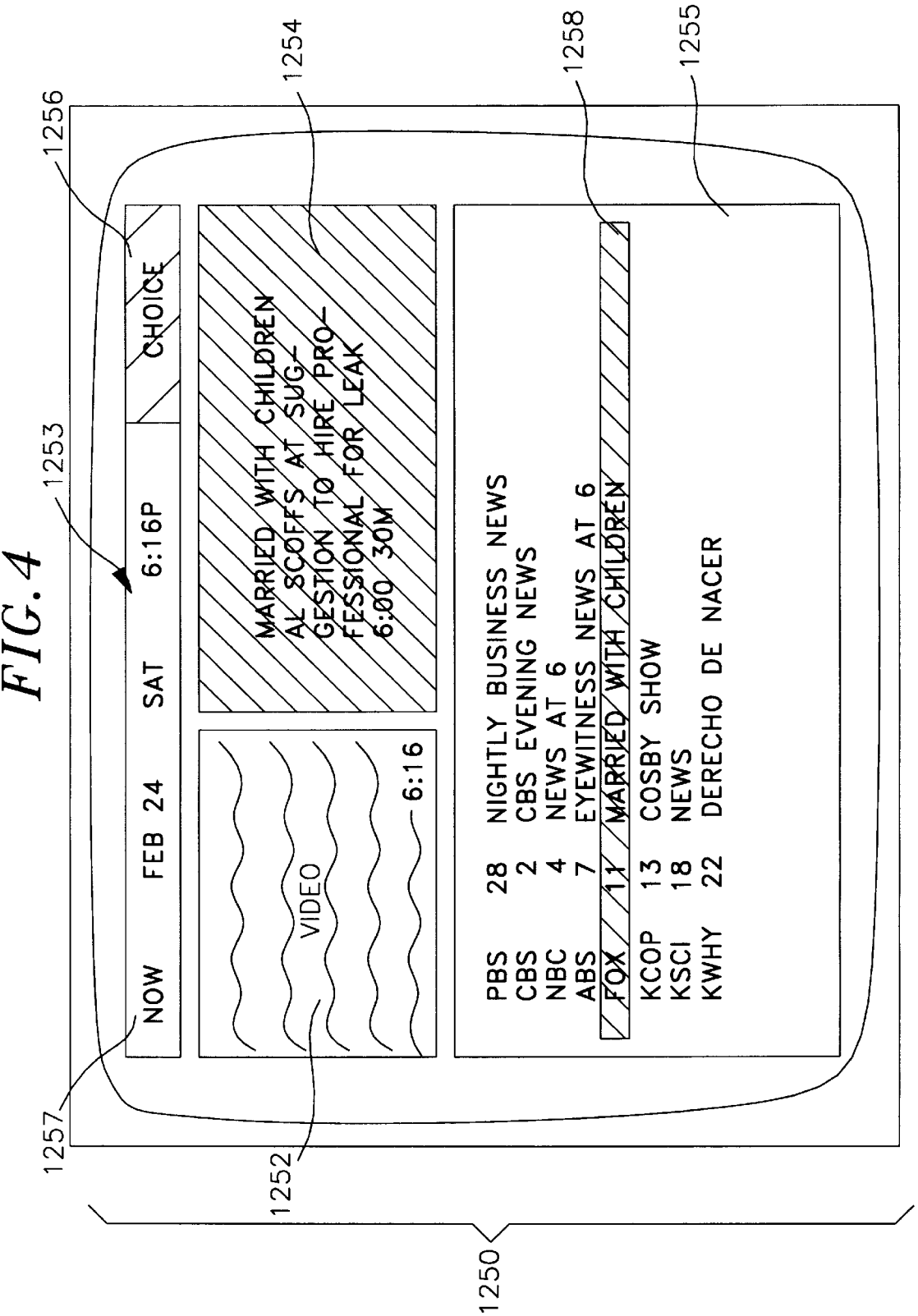
FIGS. 4 and 5 are television screens formatted according to the present invention.

The viewer input device 1288 preferably takes the form of a hand-held remote infrared (IR) transmitter which communicates with an infrared receiver connected to microprocessor 1284. As shown in FIG. 3, the remote 1310 has a housing on which a number of control buttons are mounted. A GUIDE/TV button 1312, an INFO button 1314, and a VCR PLUS+ button 1316 are located above up and down arrow buttons 1318 and 1320. A row of buttons 1322, 1324, 1326 and 1328 which are marked with the colors red (R), green (G), yellow (Y), and blue (B), respectively, underlie down arrow button 1320. Red, green, yellow, and blue prompts are displayed in area 1253 of the electronic guides. To select a prompt on the screen, the button of the IR transmitter having the corresponding color is pressed, i.e., to select the blue prompt on the screen, blue button 1328 is pressed.

The viewer enters the electronic guide by pressing GUIDE/TV button 1312 on the remote controller. Then the electronic program guide shown in FIG. 4, which is a guide showing programs currently being received, as indicated by NOW in subarea 1257, is displayed on the screen. The user may cursor up and down the program listings in area 1255 to select a particular program. In the program selection mode, a user selects a program by moving a cursor to the corresponding program listing in area 1255. Then the user again presses the GUIDE/TV button 1312 and the program display is switched from the PIP area 1252 to the entire television screen 1250.

The user can enter a channel mapping mode by selecting CHOICE 1256 in area 1253 by pressing a corresponding color coded key on remote 1310, such as green button 1324, which will cause video processor 1296 (FIG. 7) to display on television monitor 1280 (FIG. 7) mode selections (not shown), one of which is a channel mapping mode. One way of displaying mode selections is to use banner area 1253 to display color coded subareas for each mode. Once the channel mapping mode is selected, then the television screen is formatted to appear as shown on FIG. 5 and the banner area 1253 indicates the mode by CHANNEL MAPPING in subarea 1257.

In the channel mapping mode, the tuner 1272 (FIG. 7) is controlled to cycle through each channel with a signal. At each channel the user sees the program on the currently tuned to channel in the 1252 area of the screen and is asked, via message 1261 displayed at the bottom of the screen, to find the title of the currently tuned to program in the program schedule in area 1255. In the channel mapping mode, while the user moves the cursor to the correct program in the program schedule, the channel tuned to does not change and the program on the currently tuned to channel continues to be displayed in area 1252. When the user has positioned the cursor on the program listing that the user thinks corresponds to the displayed channel, the user presses a button on the remote controller of FIG. 3, such as blue button 1328, which is effectively in this mode an ENTER key, to select the listing for channel mapping with the currently tuned to channel. The channel number 1280 is then accessed from the program schedule memory and compared by microprocessor 1284 (FIG. 7) with the currently tuned to channel. If they are the same, then the user has selected the correct program listing. If they do not compare, then the user has selected the wrong program listing and a message is displayed in area 1261 for the user to try again and select another program listing. If the correct program listing is selected, then the compressed code for the selected entry is read from the program schedule memory 1282 (FIG. 7) and decoded to obtain CDTL, in which C is the assigned channel number. Then the assigned channel number is paired with the currently tuned to channel number and stored in a channel map in the remote controller, TV, and/or VCR or wherever the channel map is needed for connecting decoded assigned channel numbers into local channel numbers. This process is repeated for each channel having a signal.

Figure 5:
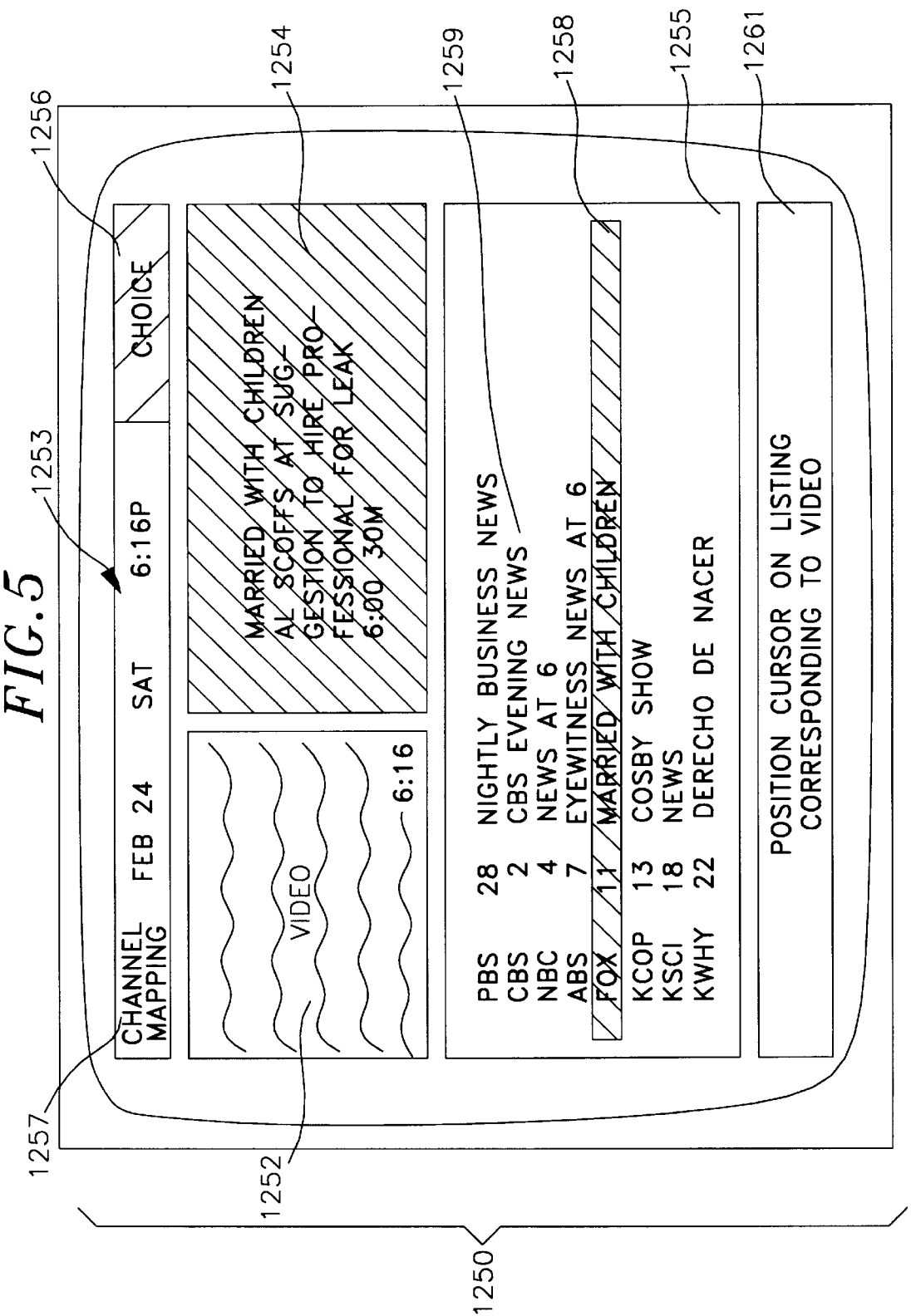
Figure 7:
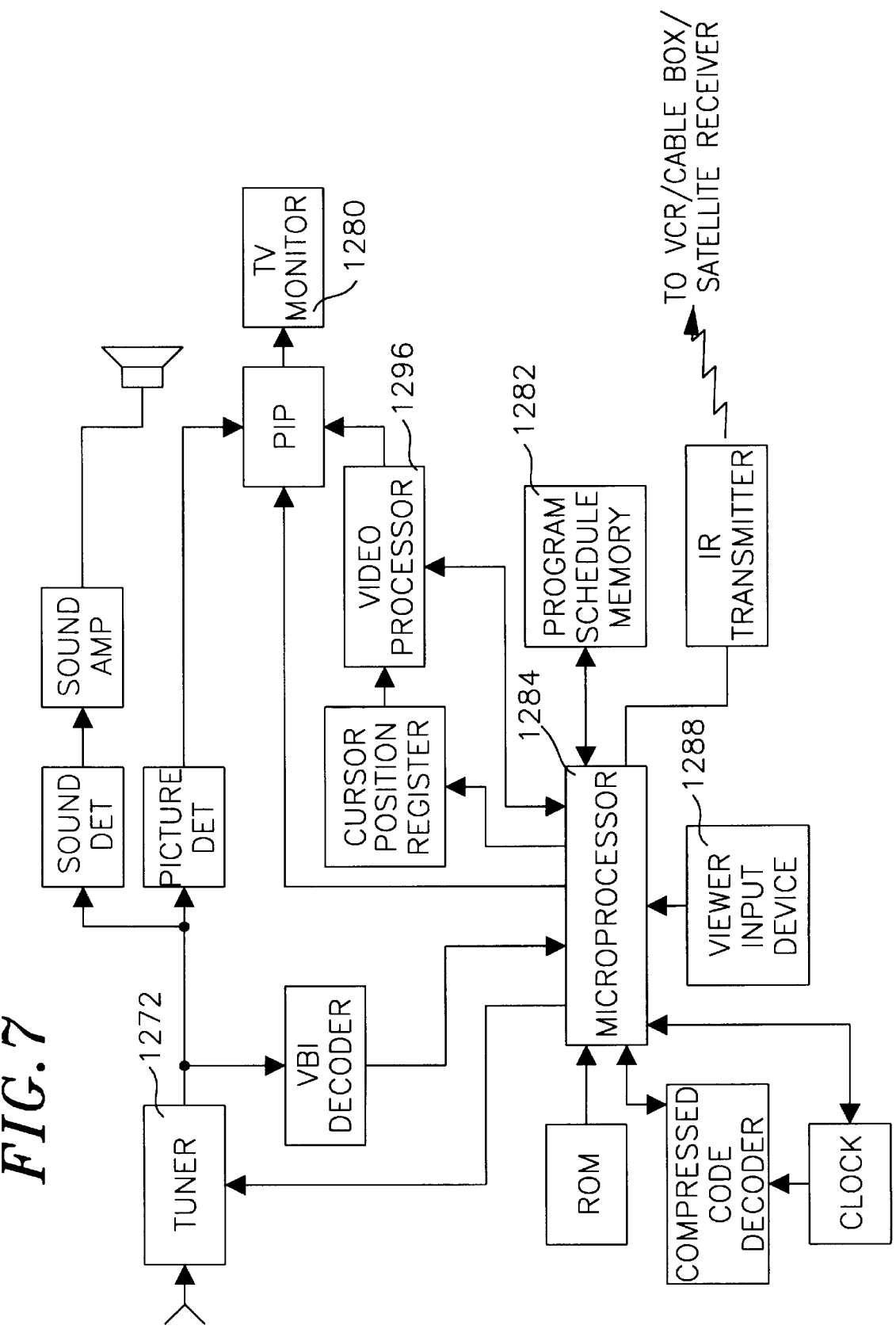
FIG. 7 is a schematic block diagram of a television receiver according to the present invention.

With reference to FIG. 5, suppose the tuner is currently tuned to channel 28. Then the program displayed in area 1252 will be the NIGHTLY BUSINESS NEWS being shown on PBS channel 28. The cursor 1258 is shown as being positioned at the listing for FOX channel 11 currently broadcasting MARRIED WITH CHILDREN, as shown by highlighted area 1258. As the user moves the cursor to the PBS channel 28 NIGHTLY BUSINESS NEWS listing 1259, the NIGHTLY BUSINESS NEWS continues to be displayed in area 1252. The brief program description shown in area 1254 can correspond to the program at which the cursor is currently positioned, as shown by FIG. 5 which shows brief description 1254 which corresponds with the MARRIED WITH CHILDREN program highlighted by cursor 1258. Alternatively, the brief program description displayed in area 1254 during the channel mapping mode, can correspond to the program currently being shown in area 1252, such as a brief program description for the NIGHTLY BUSINESS NEWS. The latter would further assist the user in finding the program listing in area 1255 that corresponds with the program being shown in area 1252.

Once the user has the cursor positioned at the proper program, and for the example above this would be the NIGHTLY BUSINESS NEWS on PBS channel 28, then the user presses blue button 1328 on remote 1310 to select the listing for channel mapping. As described above, the program schedule memory is accessed to obtain the compressed code corresponding to PBS channel 28 on February 24 at 6:16 p.m. As shown in FIG. 6, the compressed code for PBS channel 28

NIGHTLY BUSINESS NEWS, which is broadcast on February 24th at 6:00 p.m. for one hour, is 635112. The compressed code is decoded to obtain the assigned channel number, which is then paired with the local channel number, which in this case is channel 28 and then stored in a channel map memory in the remote or, for example, in a memory in microprocessor 1284. The channel map memory can then be accessed at a later time to convert an assigned channel number, that has been decoded from a compressed code, into a local channel number, which can be used, for example, for tuning a VCR, to record a program corresponding to the compressed code. When the user presses the blue key 1228, the tuner 1272 is also commanded to tune to the next channel having a signal, and then the process of channel mapping is repeated for the next channel. This is repeated until channel mapping has been performed for all of the channels containing signals.

Reference is made to the attached Appendix for more information about the operation of the described channel mapping editor.

TABLE 7

Using Channel Editor Screen
The Channel Editor Screen allows the user to turn channels on or off and remap the channel associated with stations. Any changes made in the Editor are not saved until the user leaves the screen. Prior to leaving the Editor, any changes made on the channel lines may be cancelled (all at once) by pressing the Blue (1) action button while a channel line is highlighted prior to leaving the screen.

| Remote Key | Channel Editor Screen |
|---|---|
| up key | 1. if channel line highlighted, moves up to the next channel line (unless the top channel line is highlighted, see 2 below) until the topmost visible channel line is highlighted, then a full page of new tiles appear with the bottom row highlighted<br>2. if the top channel line is highlighted, moves up to the Editor destination button<br>3. if Editor destination button is highlighted, nothing happens<br>4. if bottom panel ad highlighted, moves up to top panel ad<br>5. if top panel ad is highlighted, nothing happens |
| down key | 1. if channel line is highlighted, moves down to the next channel line until the last visible channel line is reached, then a full page of new title tiles appears with top row highlighted; if the last channel line in the list is highlighted, nothing happens<br>2. if Editor destination button is highlighted, moves down to the top channel line in the Editor<br>3. if top panel ad is highlighted, moves down to bottom panel ad<br>4. if bottom panel ad is highlighted, nothing happens |
| left key | 1. if one of top 4 channel lines is highlighted, moves to top panel ad; if one of bottom 5 channel lines is highlighted, moves to bottom panel ad; if there are no channel lines, the panel ads can not be highlighted<br>2. if Editor destination button is highlighted, the highlight moves left to the Messages button and the Messages list appears on screen<br>3. if Panel ad is highlighted, nothing happens |
| right key | 1. if highlighted on a channel line, nothing happens<br>2. if Editor destination button is highlighted, the highlight moves right to the Setup button and the First Setup screen appears<br>3. if Panel ad is highlighted, moves to the channel line from which the first Panel ad was accessed |
| OK key | 1. if channel line is highlighted, nothing happens<br>2. if Panel ad with show related info. is highlighted, exits guide, tunes TV to related channel; if ad does not have related show info., nothing happens<br>3. if Editor destination tile in Menu Bar is highlighted, redraws the top of the screen (if not currently displayed), highlight jumps to the first entry in the screen |
| Guide key | exits the guide, and tunes TV to channel displayed in the Video Window |
| Info | 1. if highlight is on a Panel ad, cycles through any additional info. screens; once last screen of information is displayed, pressing the info. key closes the expanded info. box<br>2. if an "i" icon is not displayed in the info. box, nothing happens |
| Blue Action Button (1 for TCE) | 1. if Panel ad with show related info. is highlighted and not previously set to record or watch, Blue (1) action button label is "Watch," sets the show to watch once, places show in Record/Watch Schedule, changes Blue (I) action button label to "Cancel" and Green action button label to "Schedule," highlight turns orange, info. box background turns orange and message indicates record accepted, tunes to the show channel if the show is on now; Note: if a show in this time slot wa already set to record or watch, the actions listed above do not occur and a conflict message appears in the Info. box<br>2. if a Panel ad was just set to record or watch, pressing the Blue (1) action button again without leaving the Panel ad will Cancel the recording or watch scheduling, change the Blue (1) action button label back to "Watch" and the Green (3) action button label to "Record," highlighting back to the standard highlighting, info. box returns to gray background with original text<br>3. if Panel ad with show related info. is highlighted and was previously set to record or watch, the Blue (1) action button lable is blank, nothing happens<br>4. if panel ad without show related info. is highlighted, the action button label is blank, nothing happens<br>5. if Editor destination button is highlighted, the Blue (1) action button lable is blank, nothing happens<br>6. if a channel line is highlighted, the Blue (1) action button label is "Cancel," cancels any changes made since entering the Editor |

TABLE 7-continued

Using Channel Editor Screen
The Channel Editor Screen allows the user to turn channels on or off and remap the channel associated with stations. Any changes made in the Editor are not saved until the user leaves the screen. Prior to leaving the Editor, any changes made on the channel lines may be cancelled (all at once) by pressing the Blue (1) action button while a channel line is highlighted prior to leaving the screen.

| Remote Key | Channel Editor Screen |
|---|---|
| Gray Action Button (2 for TCE) | 1. if a channel line is highlighted, action button is labeled "Change," activates the ability to dial in a new channel number for the currently highlighted channel line using the digits on the remote<br>2. if any other area is highlighted, the action bar label is blank, nothing happens |
| Green Action Button (3 for TCE) | 1. if Panel ad with show related info. is highlighted and not previously set to record or watch, Green (3) action button label is "Record," sets the show to record once (records immediately if the show is on now), places it in the Record/Watch Schedule, changes Green (3) action button label to "Schedule," Blue (1) action button label to "Cancel," highlight and time slot header turn red, info box background turns red and message indicates record accepted; Note: if a show in this time slot was already set to record or watch, the actions listed above do not occur and a conflict message appears in the Info box<br>2. if Panel ad is highlighted and set to record or watch, the Green (3) action button label is blank, nothing happens<br>3. if Panel ad without show related info. is highlighted, action bar label is blank, nothing happens.<br>4. if Editor destination button is highlighted, the Green (3) action button label is blank, nothing happens<br>5. if a channel line is highlighted, the Green (3) action button is labeled "On/Off," toggles the state of the channel between on and off |
| digit keys (for TCE only after the Gray (2) action button is pressed first) | 1. if a channel line is highlighted, the channel numbers in the currently selected channel line disappear and the new digits appear as dialed; the dialed number registers once the highlight is moved off the chanel tile (up, down, left menu, Guide) or if the user presses the OK key, or Green (3) action button; changes are not saved until the Editor screen is left<br>2. if a Panel ad or a destination button is highlighted, nothing happens |
| VCR Plus+ | 1. if Panel ad is highlighted, functions the same as pressing the Green (3) action button<br>2. if Editor destination button or channel line is highlighted, nothing happens |
| Optional Keys | |
| Menu | 1. if highlight not on the Menu Bar (on a channel line or a Panel ad), jumps highlight to the Editor destination button in the Menu Bar, the screen does not redraw<br>2. if highlight on the Menu Bar, moves highlight to the top channel line, except as noted in 3 below<br>3. if highlight was palced on the Menu Bar by a prior press of the menu key and no other key presses have occurred while the highlight was on the Menu Bar, jumps highlight to where the highlight was last in the scheduled show list or on a Panel ad |
| Record | functions the same as pressing the Green (3) action button |
| Page up | 1. if there is a page of channel lines above, the screen fills with a completely new set of the next 9 channel lines above, the highlight remains in the same relative locatin on screen; if there is not a page of data above, the highlight jumps to the top entry of the currently displayed screen; once at the top of the list, highlight moves to the menu bar; from the menu bar, pressing Page Up does nothing<br>2. if a panel ad is highlighted, nothing happens |
| Page down | 1. if the destination button is highlighted, moves down to the first visible entry in the screen<br>2. if a channel line is highlighted and there is a full or partial page of channel lines below, the screen fills with a new set of the next 9 channel lines or a partial page of the channel lines below, the highlight remains in the same relative location on screen or on the last entry on the new screen if the relative position is not available; if the highlight is on the last screen of data and the Page Down key is pressed, the highlight jumps to the last entry in that screen; once at the bottom of the list, pressing Page Down does nothing<br>3. if a panel as is highlighted, nothing happens |
| Channel up | mapped to Page Up |
| Channel down | mapped to Page down |
| Clear | exists the Guide and displays the program that was viewed before the Guide was entered (Last Channel) |
| PIP | nothing happens |

What is claimed is:

1. A method for creating a channel map comprising the steps of:

receiving a telecast program with a television tuner set to a channel;

displaying the program on a monitor screen in a PIP window;

storing in a memory a database of telecast program listings including title and a local channel number;

displaying a program listing in the database on the screen;

issuing a channel changing command from a controller;

setting the tuner to another channel responsive to the channel chancing command;

changing the local channel number displayed on the screen responsive to the channel changing command; and comparing the program displayed in the PIP window with the displayed program listing.

2. The method of claim 1, additionally comprising the step of changing the channel to which the tuner is set until the program displayed in the PIP window matches the displayed program listing.

3. The method of claim 1, in which the displaying step displays a plurality of program listings on the screen at the same time and the changing step comprises highlighting one of the displayed program listings with a moveable cursor and changing the channel of the highlighted program listing.

4. The method of claim 1, in which the controller has up/down arrow keys to move the cursor from one program listing to another program listing and an enter key to store in the memory the channel to which the tuner is set and the changing step comprises pressing the up/down arrow keys until the desired program listing is highlighted and pressing the enter key to store the channel to which the tuner is set as the channel number of the desired program listing.

5. The method of claim 1, in which the storing step stores the database that also includes network channel names and the step of displaying a program listing displays a network channel name and the local channel number together.

6. A method for editing a channel map comprising the steps of:
receiving a telecast program with a television tuner;
displaying the program on a monitor screen;
storing in a memory the channel map comprising corresponding pairs of network channel names and local channel numbers;
displaying on the screen with the displayed program a portion of the stored channel map;
highlighting one of the local channel numbers of the displayed portion;
setting the tuner to the highlighted local channel number;
changing the highlighted local channel number and the tuner together without changing the corresponding network channel name;
comparing the displayed program with the highlighted local channel number to confirm the correspondence between the highlighted local channel number and the network channel name stored with the highlighted local channel number.

7. The method of claim 6, in which the step of displaying the program displays a program in a PIP window.

8. The method of claim 6, additionally comprising the step of storing the confirmed pairs of local channel numbers and network channel names in the memory to replace unconfirmed pairs.

9. The method of claim 8, additionally comprising the step of issuing a change command to initiate the step of storing the confirmed pairs.

10. The method of claim 9, additionally comprising the step of issuing a cancel command to cancel storage of the confirmed pairs.

11. The method of claim 6, in which the stored channel map additionally comprises a display status for each channel represented by a network channel name, the method additionally comprising the steps of displaying the display status with the displayed portion of the channel map, toggling the displayed status between "on" and "off", and later displaying an electronic program guide that displays program listings for only the "on" channels.

12. The method of claim 6, in which the storing step additionally stores program titles with the pairs and the step of displaying a portion of the stored channel map additionally displays the program titles.

13. A method of assembling a channel map that correlates regional channel names to local channel numbers, the method comprising the steps of:
setting a television tuner to a local channel number;
displaying on the screen of a display monitor a program telecast on the local channel number to which the tuner is set;
identifying the displayed program in a data base of currently telecast program titles, a regional channel name being associated with each program title in the data base;
retrieving from the data base the regional channel name with which the program title is associated;
entering into the channel map the local channel number to which the tuner is set and the retrieved regional channel name in paired fashion; and
repeating steps a to e until the channel map is complete.

14. The method of claim 13, in which the data base is a printed television program guide that has a compressed code representation of the regional channel name, day, start time, and length of each program title in the data base and the identifying step comprises perusing the program guide to ascertain the compressed code representation of the identified program and the entering step includes decoding the compressed code representation of the identified program to derive the regional channel name.

15. The method of claim 13, in which the data base is an electronic program guide that has stored in a program schedule memory in addition to the currently telecast program titles, the regional channel name, day, start time, and length of the program associated with each program title, the identifying step comprises displaying on the screen the currently telecast program titles and selecting one of the displayed titles and the entering step includes retrieving the regional channel name associated with the selected title from the program schedule memory for entry into the channel map.

16. The method of claim 15, in which the step of displaying on a screen the program telecast on the local channel number to which the tuner is set and the step of displaying on the screen the currently telecast program titles display the telecast program and the program titles simultaneously.

17. The method of claim 16, in which the step of selecting one of the displayed titles comprises moving a cursor on the screen to highlight the selected title.

18. The method of claim 15, in which the step of selecting one of the displayed titles comprises moving a cursor on the screen to highlight the selected title.

19. The method of claim 13, in which the local channel numbers in the channel map are represented by electrical signals, the method additionally comprising the step of issuing an electrical signal representative of the regional channel name and retrieving from the channel map the electrical signal representative of the local channel number paired with the regional channel name represented by the issued signal.

20. Apparatus for assembling a channel map comprising:
a television tuner;
means for setting the tuner to a first local channel number;
means for displaying on the screen of a display monitor a program to which the tuner is set;
a data base of currently telecast program titles, a regional channel name being associated with each program title in the data base;
memory means for storing the channel map that correlates regional channel names to local channel numbers;

means for retrieving from the data base the regional channel name associated with the title of the displayed program; and means for entering into the memory means the local channel numbers to which the tuner is set and the retrieved regional channel name in paired relationship.

21. The apparatus of claim 20, additionally comprising means responsive to the entering means for setting the tuner to a second local channel number.

22. The apparatus of claim 21, additionally comprising:

means for displaying on the screen the program to which the tuner is set by the second local channel number;

means for retrieving from the data base a second regional channel name associated with the title of the program; and means for entering into the memory means the second local channel number to which the tuner is set and the second regional channel name in paired relationship.

23. The apparatus of claim 20, additionally comprising means for displaying the currently telecast program titles on the screen and means for highlighting one of the displayed titles with a movable cursor.

24. The apparatus of claim 23, in which the retrieving means retrieves the highlighted title.

25. The apparatus of claim 23, in which the means for displaying the program to which the tuner is set and the means for displaying the currently telecast titles simultaneously display the program and the titles on the screen.

26. The apparatus of claim 20, in which the means for setting the tuner to a first local channel number comprises means for scanning channels successively to determine which local channel numbers are not paired with a regional channel name, means for setting the tuner to each such local channel number in turn until a regional channel number is entered, and means for setting the tuner to another local channel number until all the local channel numbers are paired with regional channel numbers.

27. The apparatus of claim 26, additionally comprising means for displaying on the screen a message after all the local channel numbers are paired with the regional channel numbers.

* * * * *